United States Patent [19]
Rutty et al.

[11] 4,429,462
[45] Feb. 7, 1984

[54] VARIABLE STIFFNESS RULE BLADE, RULE EMPLOYING SAME, AND METHOD OF MAKING SAME

[75] Inventors: Edward C. Rutty, Portland; Carl C. Stoutenberg, Burlington, both of Conn.

[73] Assignee: The Stanley Works, New Britain, Conn.

[21] Appl. No.: 430,730

[22] Filed: Sep. 30, 1982

[51] Int. Cl.³ .............................................. G01B 3/02
[52] U.S. Cl. ..................................... 33/138; 242/84.8
[58] Field of Search ........................... 33/138, 137 R; 242/84.8

[56] References Cited

U.S. PATENT DOCUMENTS

| | | | |
|---|---|---|---|
| 950,581 | 3/1910 | Tracy | 33/138 |
| 1,730,199 | 10/1929 | Farrand | 33/138 |
| 2,050,941 | 8/1936 | Farrand | 33/138 |
| 2,319,724 | 5/1943 | Dinhofer | 33/138 |
| 2,410,420 | 11/1946 | Bennett | 33/138 |

FOREIGN PATENT DOCUMENTS

| | | | |
|---|---|---|---|
| 9823 | 4/1980 | European Pat. Off. | 33/138 |
| 2902882 | 1/1979 | Fed. Rep. of Germany | 33/138 |
| 104305 | 7/1899 | Fed. Rep. of Germany | 33/138 |
| 1193809 | 3/1958 | France | 33/138 |

Primary Examiner—Willis Little

[57] ABSTRACT

A coilable measuring blade for coilable rules has a concavo-convex cross section which has an intermediate portion with a smaller arc and greater height extending through and beyond the normal standout length to provide greater standout length. The blade may also have an outer terminal portion of greater height to require its deflection as it enters the rule casing and thereby provide reduction of the speed with which the blade is being retracted into the casing.

25 Claims, 20 Drawing Figures

VARIABLE STIFFNESS RULE BLADE, RULE EMPLOYING SAME, AND METHOD OF MAKING SAME

BACKGROUND OF THE INVENTION

The present invention relates to coilable rules and more particularly to such rules employing coilable metal blades with greater standout length when unsupported as extended from the casing.

Coilable metal rules are widely used and frequently employ a concavo-convex cross section or other cross sectional configuration which will stiffen the blade so that the user may singlehandedly bridge a distance with the blade tip extended in a straight line. This enables the user to bridge doorways, shaftways, excavations and the like with the unsupported blade. It is known that the degree of curvature or cross section will influence and substantially determine the standout length (the length of the blade which can be extended unsupported without collapsing at the support point) or breakpoint (the point at which the unsupported rule will collapse) for a rule of any particular width, thickness and metal characteristics.

Such blades are generally used in power returnable coilable rules that include a coiled spring which has the effect of retracting the extended blade into the rule housing or casing wherein it coils about the reel in its retracted position. It will be appreciated that the concavo-convex cross section of the blade is flattened as it is coiled within the rule casing, whether by manual action or by the retracting effect of such a power return spring. The stiffer the blade, the more spring power required to effect such flattening of the blade upon retraction.

As is also well known, blades employing such a concavo-convex cross section generally must be heat treated to achieve the desired flexural characteristics to withstand the repeated flattening operation that occurs in the coiling of the blade within the rule casing. It has been necessary to balance the advantages to be gained by increasing the depth of curvature of the blade for increased length of blade standout with the power requirements for the spring to effect its retraction and also with the life characteristics resulting from repeated deflection into the flattened condition when the blade is coiled.

Moreover, because the extended blade will assume the concavo-convex cross section, the indicia which are imprinted thereon become more difficult to read when the arcuate cross section becomes steeper. Lastly, when there is a very high cross curve or deep cross section, there is a stress point at the point where the blade does buckle when fully extended, which, over repeated usage, may cause a stress fracture.

Because of the necessity for balancing these various factors, the range of average standout lengths for commercially available widths of concavo-convex blades is set forth in the following table:

| BLADE WIDTH, INCHES | STANDOUT LENGTH, INCHES |
| --- | --- |
| ¼ | 12–16 |
| ½ | 35–43 |
| ¾ | 55–73 |
| 1 | 86–97 |

Various cross sections have been used for the concavo-convex blade construction. Generally, the cross section is a segment of a circular arc or a segment of a circular arc with straight segments at its ends (e.g., rectilinear portions which are tangential to the center arcuate segment). In this manner the concavo-convex cross section will not have any sharp bends which would produce points where the blade will be overstressed during the repeated flattening operation, and the amount of force required to flatten the curve is more readily available from economically utilizable power return springs.

It is an object of the present invention to provide a novel coilable metal blade for a rule which provides greater standout length.

It is also an object to provide such a blade which can be readily and economically fabricated and which will enjoy long life.

Another object is to provide such a blade which will slow the rate of retraction as the blade is almost fully retracted into the casing.

A further object is to provide a novel rule employing such a blade and which may be fabricated readily and relatively economically.

Yet another object is to provide a novel method for fabricating such coilable metal rule blades offering enhanced or great standout.

SUMMARY OF THE INVENTION

It has now been found that the foregoing and related objects may be readily attained in a coilable rule blade providing greater standout length and comprising an elongated strip of resiliently deflectable metal having a substantially uniform width in its coiled flattened state and, in its uncoiled state, a concavo-convex cross section along substantially its entire length. This concavo-convex cross section has a central segment of arcuate configuration defined by a radius R and has a depth H.

The blade has a first portion adjacent one end thereof having a depth $H_1$ and a radius $R_1$, a second portion which extends from the first portion and has a depth $H_2$ and a radius $R_2$, and a third portion which extends from the second portion to adjacent the other end with a depth $H_3$ and a radius $R_3$. The depth $H_2$ of the second portion is greater than the depth $H_1$ and $H_3$ of the first and third portions, and its radius $R_2$ is less than the radii $R_1$ and $R_3$ of the first and third portions. The second portion extends for a portion of the length of the blade including the normal breakpoint for a blade of that width and having a uniform cross section corresponding to the depth $H_1$ and radius $R_1$ of the first portion, and the second portion continues beyond such breakpoint towards the other end of the blade to provide the greater standout length.

In its preferred form, the entire cross section of each of the blade portions is defined by a single continuous arc of the respective radius, or the cross section of each of the blade portions includes substantially rectilinear segments tangential to the ends of the central arcuate segment.

Conveniently, the depth $H_3$ and radius $R_3$ of the third blade portion are substantially equal to the radius $R_1$ and depth $H_1$ of the first blade portion. The radius $R_2$ and depth $H_2$ of the segment in the second blade portion is conveniently substantially uniform over substantially the entire length of the second portion for ease of fabrication. However, a highly effective structure is one in which the radius $R_2$ of the arcuate segment of the second portion decreases in length and the depth $H_2$ increases from the first portion towards the third portion of the blade. In such an embodiment, the decrease in radius $R_2$ and increase in depth $H_2$ in the second portion is preferably at a substantially uniform rate over substantially the entire length of the second portion. However, the radius $R_2$ of the second portion most desirably increases, and the depth $H_2$ correspondingly decreases, at a rapid rate adjacent the third portion so as to blend thereinto. In one embodiment, the blade has a terminal portion adjacent its one or outer end which has a radius $R_4$ for its arcuate segment which is smaller than the radius $R_1$, and it correspondingly has a depth $H_4$ greater than the depth $H_1$ of the first portion of the blade.

The blade is used in a coilable rule assembly which includes a casing having end walls and a peripheral sidewall defining a chamber therebetween and in which the sidewall has an exit aperture therethrough. As is conventional, the coiled rule blade in the chamber has one end extending outwardly of the casing aperture. The rule assembly will generally include a coiled power return spring within a reel in the chamber and which has its outer end engaged with the inner end of the blade which is coiled thereabout.

In one embodiment, the rule casing cooperates with a blade having a deeper cross section for its outer end portion and has an exit aperture which is of a depth $H_5$ less than the depth $H_4$ of the terminal portion of the blade so as to cause deflection thereof as it passes therethrough to reduce the rate of retraction of the blade under the action of the power return spring.

In making the coilable rule blade, a length of resiliently deflectable metal strip having a width W is provided, and the blade is formed to provide in a first portion of the length a concavo-convex cross section having a central segment of arcuate configuration defined by a radius $R_1$ and having a depth $H_1$. A second portion of the length is formed into a concavo-convex cross section having a central segment of arcuate configuration defined by a radius $R_2$ and having a depth $H_2$, and the radius $R_2$ is less than, and the depth $H_2$ is greater than, $R_1$ and $H_1$, respectively. A third portion of the length extending from the second portion is formed into a concavo-convex cross section having a central segment of arcuate configuration defined by a radius $R_3$ and having a depth $H_3$, with the radius $R_3$ being greater than, and the depth $H_3$ being less than, $R_2$ and $H_2$, respectively.

The forming step may be by a cold forming technique in which the length is hardened and tempered and thereafter roll formed to shape the several portions of the length into the desired cross section, or by a hot forming technique in which the heated blade is roll formed, quenched and tempered. Conveniently, the several portions of the length of metal strip are formed initially in a roll forming operation in which the length is passed through a series of roll forming dies providing a constant configuration for the several portions, and thereafter the second portion is further formed to the desired configuration. If so desired, a section of the length of strip at the end of the first portion which is spaced from the second portion may be formed into a concavo-convex cross section having a central segment of deep arcuate cross section defined by a radius $R_4$ and a depth $H_4$ respectively lesser and greater than $R_1$ and $H_1$.

DETAILED DESCRIPTION OF THE ILLUSTRATED EMBODIMENTS

Figure 1:
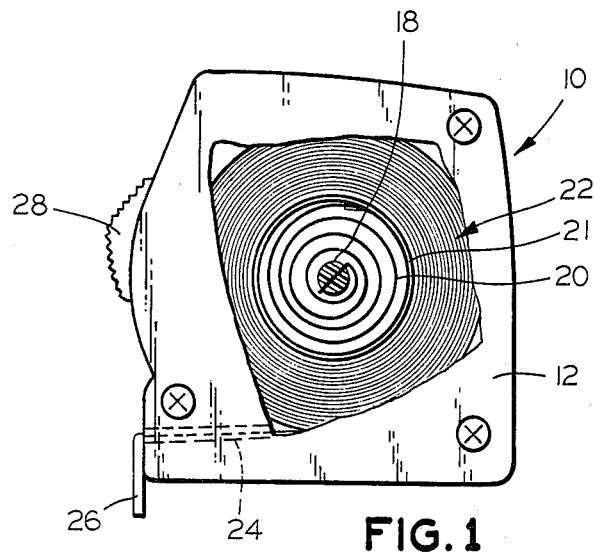
FIG. 1 is a elevational view of a power returnable coilable rule embodying the present invention with a portion of the housing end wall broken away to reveal internal construction.
Figure 2:
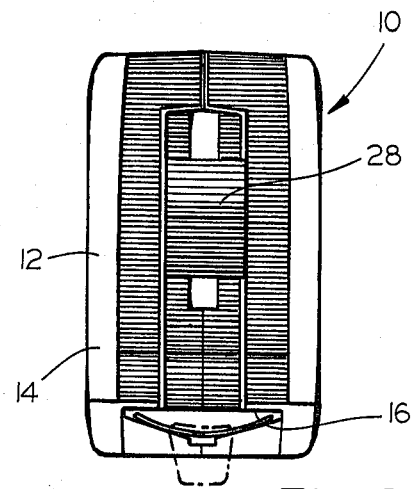
FIG. 2 is a side elevational view thereof with the end hook in phantom line for clarity of illustration of the exit aperture in the housing.
Figure 3:
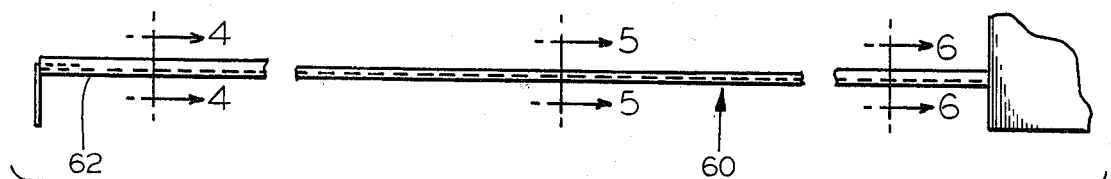
FIG. 3 is a fragmentary elevational view of the rule with the blade partially extended from the housing.

Turning first to FIGS. 1 and 2, therein illustrated is a power returnable coilable blade embodying the present invention and having a housing generally designated by the numeral 10 with end walls 12 and a peripheral sidewall 14 extending therebetween and in which there is provided an exit aperture 16. The walls 12, 14 define an internal cavity in which there is a hub 18, and a coiled power return spring 20 thereabout which has its outer end secured to the inner end of the blade generally designated by the numeral 22 and which is coiled about the reel 21. The terminal portion of the blade 22 extends through the passage 24 and outwardly of the exit aperture 16. As is conventional, a hook 26 is provided at its end which abuts the sidewall 14 about the aperture 16 and limits movement of the blade 20 inwardly of the housing 10.

Also shown is a blade locking lever 28 which cooperates with mechanism (not shown) within the casing to hold the blade 20 in an extended position as originally illustrated and described in Robert F. West U.S. Pat. No. 3,214,836 granted Nov. 2, 1965.

Turning next to FIGS. 8–11, therein fragmentarily illustrated are the several portions of an uncoiled blade generally designated by the numeral 30 and which is of substantially uniform width in its flattened or coiled condition and of concavo-convex cross section in its relaxed or extended position. The outer or first end portion 32 of the blade 30 has an arcuate cross section defined by a radius $R_1$, and it has a depth or height $H_1$.

The intermediate or second portion 34 is also of arcuate cross section which is defined by a smaller radius $R_2$, thus resulting in a greater depth $H_2$. The inner or third portion 36 is also of arcuate cross section defined by a radius $R_3$ of greater length than $R_2$ and which is of lesser height $H_3$ than the height $H_2$ of the intermediate portion 34. In each of the several portions, the arcs open in the direction of coiling of the blade.

Diagrammatically indicated by the dimension line X-Y is the normal standout length for the blade were it to have a uniform cross section equal to that of the first portion 32 throughout that length. As seen, the intermediate portion 34 of greater depth commences prior to the point Y and extends therebeyond toward the other or inner end of the blade 30. As a result of the increased stiffness provided by the cross section of the second portion 34 in accordance with the present invention, the standout length for the extended blade is signified by the dimension line X-Z.

In this embodiment, the radii $R_1$, $R_2$ and $R_3$ are substantially constant throughout their respective portions, except at the ends of the portion 34 where some tapering is present. As a result, the height $H_1$, $H_2$ and $H_3$ of the blade 30 is substantially constant in each of the several portions 32, 34 and 36.

Figure 19:
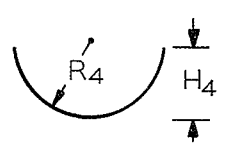
Figure 14:
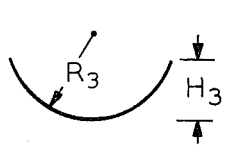
Figure 15:
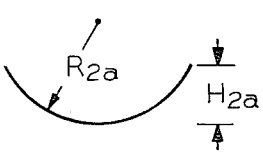
Figure 16:
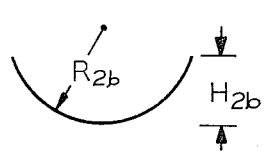
Figure 17:
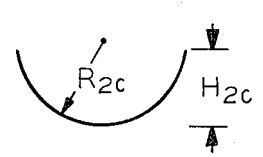
Figure 18:
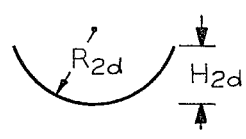

Turning now to the embodiment of FIGS 12-19, the blade generally designated by the numeral 40 has a first or outer portion 42, a second or intermediate portion 44, a third or inner portion 46, and an outer terminal portion 48 adjacent the hook. As in the instance of the prior embodiment, the first portion 42 has a radius $R_1$ and a height $H_1$; and the third portion 46 has a radius $R_3$ and a height $H_3$. In this embodiment, the radius $R_2$ of the arcuate cross section in the intermediate portion 44 progressively and gradually decreases in length as shown by the radii $R_{2a}$, $R_{2b}$, $R_{2c}$ over substantially its entire length and then rapidly increases in length adjacent the third portion 46 as shown by the radius $R_{2d}$, with attendant variation in the height of the cross section as shown by $H_{2a}$, $H_{2b}$, $H_{2c}$ and $H_{2d}$. This gradual increase in height and stiffness avoids an abrupt change and increases the stiffness as the standout length increases, as shown by the standout dimension lines X-Y and X-Z which are similar in significance to those utilized in the prior embodiment. In this embodiment, the terminal portion 48 adjacent the hook has a cross section with a relatively large depth $H_4$ and small radius $R_4$, as seen in FIG. 19, and which will provide braking action as will be described hereinafter.

Figure 20:
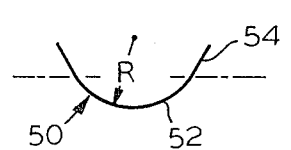
FIG. 20 is a cross sectional view of another embodiment of blade employing a modified cross section.

Turning now to the embodiment of FIG. 20 the cross section of the blade 50 has a central arcuate segment 52 defined by the radius R and rectilinear end portions 54 which are tangent to the ends of arcuate segment 52. This type of cross section is highly effective and relatively easily formed.

Figure 4:
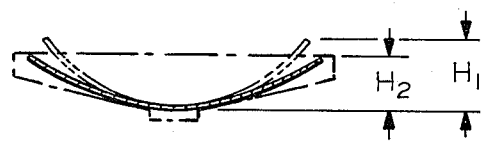
FIG. 4 is a partially diagrammatic cross sectional view of the blade at the line 4—4 of FIG. 3 with the housing exit aperture shown in phantom line and with the blade cross section shown in full line as deflected for passage therethrough and in phantom line before such deflection.
Figure 5:
FIG. 5 is a similar diagrammatic sectional view of the blade at the line 5—5 in the housing exit aperture.
Figure 6:
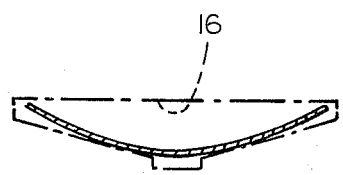
FIG. 6 is a similar diagrammatic sectional view of the blade at line 6—6 in the housing exit aperture.

The braking action of the blade embodiment 60 providing a terminal portion 62 with a deep cross section $H_1$ is illustrated in FIGS. 3-6. As seen in FIG. 4, the height $H_1$ of the relaxed terminal portion 62 is greater than the depth $H_2$ of the exit aperture while that of the adjacent first portion as shown in FIG. 5 and that of the intermediate portion as shown in FIG. 6 are less than that of the depth $H_2$. As as result, when the blade 60 is being retracted by the return spring, the terminal portion 62 must be deflected from the phantom line showing to the solid line showing in FIG. 4. The friction and spring power consumption required for such deflection slows the rate of retraction under action of the power return spring to provide a braking action, thus reducing the impact force on the hook when it abuts the rule casing.

Figure 7:
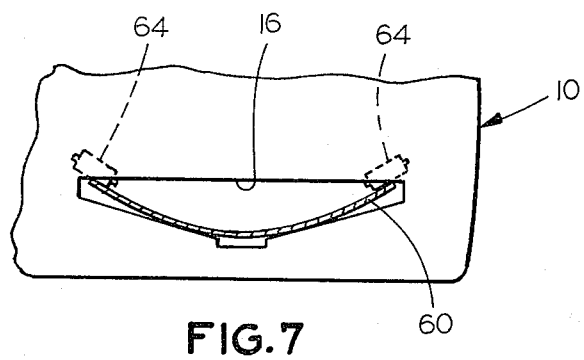
FIG. 7 is a fragmentary side elevational view of another embodiment of rule using guide rollers in the rule housing for the blade adjacent the exit aperture and with the blade shown in section.
Figure 8:
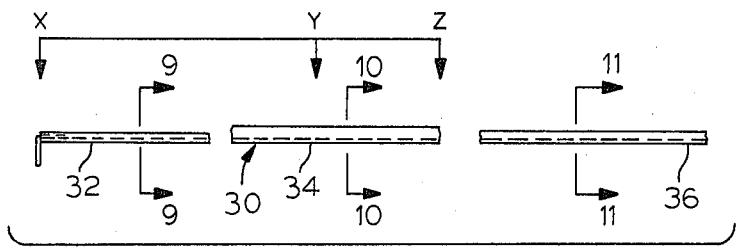
FIG. 8 is a fragmentary side elevational view of the blade showing the several portions thereof.
Figure 9:
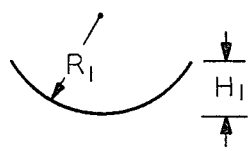
FIGS. 9–11 are sectional views thereof along the section lines 9—9, 10—10 and 11—11 of FIG. 8.
Figure 10:
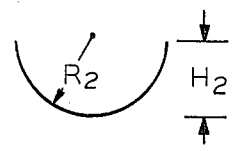
Figure 11:
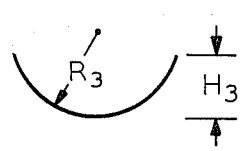
Figure 12:
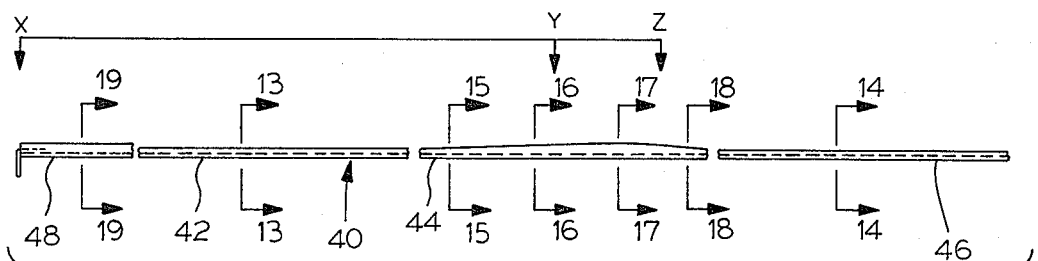
FIG. 12 is a fragmentary side elevational view of another blade embodying the present invention.
Figure 13:
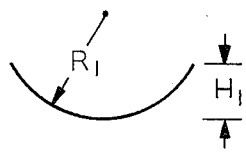
FIGS. 13–19 are sectional views thereof along the section lines 13—13, 14—14, 15—15, 16—16, 17—17, 18—18 and 19—19 of FIG. 12.

Turning now to FIG. 7, the rule of this embodiment includes a pair of rollers 64 inside the housing 10 adjacent the upper side margins of the exit aperture 16 so that the terminal portion 62 of the blade 60 is guided thereby and more readily deflected with less friction between the blade 60 and the wall of the casing 10 about the exit aperture 16. This improves the efficiency of the return spring when such braking action is desired, particularly when only a short length of the blade 60 has been extended.

As has been previously indicated, the cross section of the blades of the present invention may comprise a continuous circular arc defined by a single radius, a curvilinear arc defined by a central arcuate segment of one radius and outer arcuate segments of another radius, or a composite of a central arcuate segment and rectilinear segments tangential to the ends of the arcuate segments. From convenience and life standpoints, continuous circular arc and arc/tangent composite configurations are preferred.

The increase in curvature and depth in the intermediate portion may be effected by a gradual uniform increase to a point beyond the new breakpoint, or by a series of discrete incremental steps in radius change, or by a single incremental increase to produce a deeper cross section which is substantially uniform over the entire length except for tapering at the ends thereof. From cost and manufacturing standpoints, a single increment is most easily effected; however, a gradual increase, or a series of incremental steps, is desirable from the standpoint of minimizing the overall increase in stiffness and attendant increase in spring power required to effect flattening during retraction.

The length of the radii in, and the heights of, the concavo-convex cross section, will vary with the metal employed, the width of the strip, the physical characteristics of the metal, etc. Such radii and heights will be readily apparent to those having ordinary skill in this art with the teaching of this specification before them. It will be appreciated that excessive stiffness in cross section is to be avoided because of its detrimental effect upon the return spring power requirements and upon life of the blade. Accordingly, the intermediate cross section with its increase should not be overly extended in length but should encompass a distance beginning at about 70-90 percent or the normal standout length and ending at about 105-120 percent of the enhanced standout length.

The methods employed for forming the blade will generally involve a hot forming operation to effect a substantially uniform cross section over the entire length of the strip, followed by tempering, or a cold forming operation followed by stress relieving. Roll dies are preferably used in conjunction with elongated strip intended to be severed into the desired lengths for the individual blades, although brake forming of the severed lengths may also be employed. The severed blade lengths are then further formed to provide the increased curvature in the intermediate portion, either by a brake forming die and mandrel assembly or by a roller die assembly depending upon the type of increase desired. Brake forming of the severed lengths which have been previously uniformly formed has been found to be readily added to the existing manufacturing operations.

Although the increased depth of cross section in the outer terminal section illustrated in one of the embodiments will have the effect of increasing the frictional resistance to retraction and thus augment braking action, it will be appreciated that it also increases the power requirement for retracting the extended blade if the length extended comprises only such terminal section. Thus, some manual assistance may be necessary to augment the spring force. To some extent, this problem may be reduced by employing friction reducing rollers inside the case adjacent the exit aperture and by using a low friction synthetic resin insert to define the exit aperture as shown in the illustrated embodiment. The length of this braking section should not exceed about eighteen inches and preferably comprises the first 6–12 inches of the blade length. Conveniently, its arcuate cross section is of a depth about 5–15 percent greater than the height of the exit aperture in the casing.

EXAMPLE ONE

Exemplary of the method of making such blades is the following process used for the generation of a 1 inch wide blade having increased standout length.

Steel strip of SAE 1095 alloy is spheroidized annealed and lightly rolled to prevent kinking, and has a Rockwell B hardness of 97–99. The steel strip has a width of one inch and a thickness of 0.0045 inch (+ or −0.0003 inch).

The annealed strip is then heated to a temperature of about 1550° Fahrenheit in a continuous strip form and is passed through forming dies which form the strip into the desired cross section which is uniform along its length. Thereafter, the strip is quenched and cooled to fix the configuration so generated, passed through a furnace wherein its temperature is raised to about 700° Fahrenheit to effect tempering and relieve brittleness, and thereafter cooled. At this time, the strip is found to have a cross section with a arcuate center section defined by a radius of 0.786 inch and tangential rectilinear segments of 0.168 inch in length and which cross section extends throughout the length thereof. The total height of the cross section is 0.138 inch.

The strip is then coated with a primer paint which is baked, and the strip is flattened by backbending and imprinted with the indicia in repeating patterns in accordance with the desired lengths thereof. Preferably, the imprinted blade is then laminated in a polyethylene terephthalate film.

The printed strip is then passed through a cutoff station where the precise lengths are severed and at which the intermediate portion of the severed length is simultaneously cold formed into the desired cross section. This forming is performed in two steps in a press brake die which further forms the portion commencing at 42 inches from the 0 inch point of the blade and ending at 116 inches, and which uses a cooperating mandrel with tapered ends to effect a 2-inch transition from the original cross section to the new cross section (i.e., 42–44 inches and 114–116 inches). The cut off length is first further formed in one stroke along one side of the center line, and then along the other side of the center line in the second stroke, to produce a cross section in the intermediate portion where the radius of the arcuate segment is 0.459 inch and the height is 0.226 inch; the length of the rectilinear segments is unchanged. Following this cold forming step to augment the curve in the intermediate section, the cut off length is stress relieved by front bending it about a roll and then back bending. As will be appreciated, the resultant blade is relatively free from stresses and relatively stable in an extended position.

Following the stiffening operation, the cut off blade is found to have a standout length of about 112 inches as compared to a standout length of about 60 inches for blades of uniform cross section, i.e., which are not subjected to the additional forming step.

Thus, it can be seen from the foregoing detailed description and the attached drawings that the blades of the present invention provide rule blades having increased standout length and that they may be fabricated readily and relatively economically. Moreover, they enjoy relatively long life in operation and may be utilized in conventional power returnable rules. In accordance with one aspect, the blades are also provided with a braking section adjacent their outer end to reduce the impact upon the blade hook or the like.

Having thus described the invention, we claim:

1. A coilable rule blade having greater standout length comprising an elongated strip of resiliently deflectable metal having a substantially uniform width in its coiled flattened state and, in its uncoiled state, a concavo-convex cross section along substantially its entire length with the arc opening in the direction of coiling, said blade being relatively free from stresses and relatively stable in the extended position, said cross section having a central segment of arcuate configuration defined by a radius R and having a depth H, the length of said blade being comprised of three portions, a first portion adjacent one end thereof with a depth $H_1$ and radius $R_1$, a second portion extending from said first portion with a depth $H_2$ and a radius $R_2$, and a third portion extending from said second portion to adjacent the other end thereof with a depth $H_3$ and a radius $R_3$, said second portion having a depth $H_2$ greater than the depth $H_1$ and $H_3$ of said first and third portions and a radius $R_2$ less than the radii $R_1$ and $R_3$ of said first and third portions, said second portion extending for a portion of the length of said blade which includes the normal breakpoint for a blade of said width and of a uniform cross section corresponding to the depth $H_1$ and radius $R_1$ of said first portion and which extends beyond said normal breakpoint towards said other end of said blade to provide greater standout length.

2. The coilable rule blade of claim 1 wherein the entire cross section of each of said portions is defined by a single continuous arc of the respective radius.

3. The coilable rule blade of claim 1 wherein the cross section of each of said portions includes substantially rectilinear segments tangential to the ends of said central arcuate segment.

4. The coilable rule blade of claim 1 wherein the depth $H_3$ and radius $R_3$ of said third portion are substantially equal to the radius $R_1$ and depth $H_1$ of said first portion.

5. The coilable rule blade of claim 1 wherein said radius $R_2$ and depth $H_2$ of said second portion are substantially uniform over substantially the entire length of said second portion.

6. A coilable rule blade having greater standout length comprising an elongated strip of resiliently deflectable metal having a substantially uniform width in its coiled flattened state and, in its uncoiled state, a concavo-convex transverse cross section along substantially its entire length, said cross section having a central segment of arcuate configuration defined by a radius R and having a depth H, said blade having a first portion adjacent one end thereof with a depth $H_1$ and a radius $R_1$, a second portion extending from said first portion with a depth $H_2$ and a radius $R_2$, and a third portion extending from said second portion to adjacent the other end thereof with a depth $H_3$ and a radius $R_3$, said second portion having a depth $H_2$ greater than the depth $H_1$ and $H_3$ of said first and third portions and a radius $R_2$ less than the radii $R_1$ and $R_3$ of said first and third portions, said second portion extending for a portion of the length of said blade which includes the normal breakpoint for a blade of said width and of a uniform cross section corresponding to the depth $H_1$ and radius $R_1$ of said first portion and which extends beyond said normal breakpoint towards said other end of said blade to provide greater standout length, the radius $R_2$ of said arcuate segment of said second portion decreasing in length, and the depth $H_2$ increasing, from said first portion towards said third portion of said blade.

7. The coilable rule blade of claim 6 wherein the decrease in radius $R_2$ and increase in depth $H_2$ in said second portion are at a substantially uniform rate over substantially the entire length of said second portion.

8. The coilable rule blade of claim 6 wherein the radius $R_2$ of said second portion increases and the depth $H_2$ decreases, at a rapid rate adjacent said third portion.

9. The coilable rule blade of claim 1 wherein said blade has a terminal portion adjacent said one end with a radius $R_4$ for its arcuate segment which is smaller than the radius $R_1$, and with a depth $H_4$ greater than the depth $H_1$, of said first portion of said blade.

10. A coilable rule comprising
A. a casing having end walls and a peripheral sidewall defining a chamber therebetween, said sidewall having an exit aperture therethrough; and
B. a coiled rule blade in said chamber having one end extending outwardly of said casing aperture, said blade comprising an elongated strip of resiliently deflectable metal having a substantially uniform width in its coiled flattened state and, in its uncoiled state, a concavo-convex transverse cross section along substantially its entire length with the arc opening in the direction of coiling, said blade being relatively free from stresses and relatively stable in the extended position, said cross section having a central segment of arcuate configuration defined by a radius R and having a depth H, the length of said blade being comprised of three portions, a first portion adjacent one end thereof with a depth $H_1$ and a radius $R_1$, a second portion extending from said first portion and having a depth $H_2$ and a radius $R_2$, and a third portion extending from said second portion to adjacent the other end thereof with a depth $H_3$ and a radius $R_3$, said second portion having a depth $H_2$ greater than the depth $H_1$ and $H_3$ of said first and third portions and a radius $R_2$ less than the radii $R_1$ and $R_3$ of said first and third portions, said second portion extending for a portion of the length of said blade which includes the normal breakpoint for a blade of said width and of a uniform cross section corresponding to the depth $H_1$ and radius $R_1$ of said first portion and which extends beyond said normal breakpoint towards said other end of said blade to provide greater standout length for said blade.

11. The coilable rule of claim 10 wherein said blade has a terminal portion adjacent said one end with a radius $R_4$ for its arcuate segment which is smaller than the radius $R_1$, and with a depth $H_4$ greater than the depth $H_1$, of said first portion of said blade.

12. The coilable rule of claim 11 wherein said exit aperture is of a depth $H_5$ less than the depth $H_4$ of said terminal portion of said blade so as to cause deflection thereof as it passes therethrough to reduce the rate of retraction of said blade under the action of said power return spring.

13. The coilable rule of claim 10 including a coiled power return spring within a reel in said chamber and having its outer end engaged with the inner end of said blade which is coiled about said reel.

14. The coilable rule of claim 13 wherein the entire concavo-convex cross section of each of said blade portions is defined by a single continuous arc of the respective radius.

15. The coilable rule of claim 13 wherein the cross section of each of said blade portions includes substantially rectilinear segments tangential to the ends of said central arcuate segment.

16. The coilable rule of claim 13 wherein the depth $H_3$ and radius $R_3$ of said third blade portion are substantially equal to the radius $R_1$ and depth $H_1$ of said first portion.

17. The coilable rule of claim 13 wherein said radius $R_2$ and depth $H_2$ of said second blade portion are substantially uniform over substantially the entire length of said second portion.

18. A coilable rule comprising
A. a casing having end walls and a peripheral sidewall defining a chamber therebetween, said sidewall having an exit aperture therethrough;
B. a coiled rule blade in said chamber having one end extending outwardly of said casing aperture, said blade comprising an elongated strip of resiliently deflectable metal having a substantially uniform width in its coiled flattened state and, in its uncoiled state, a concavo-convex transverse cross section along substantially its entire length with the arc opening in the direction of coiling, said blade being relatively free from stresses and relatively stable in the extended position, said cross section having a central segment of arcuate configuration defined by a radius R and having a depth H, the length of said blade being comprised of three portions, a first portion adjacent one end thereof with a depth $H_1$ and a radius $R_1$, a second portion extending from said first portion and having a depth $H_2$ and a radius $R_2$, and a third portion extending from said second portion to adjacent the other end thereof with a depth $H_3$ and a radius $R_3$, said second portion having a depth $H_2$ greater than the depth $H_1$ and $H_3$ of said first and third portions and a radius $R_2$ less than the radii $R_1$ and $R_3$ of said first and third portions, said second portion extending for a portion of the length of said blade which includes the normal breakpoint for a blade of said width and of a uniform cross section corresponding to the depth $H_1$ and radius $R_1$ of said first portion and which extends beyond said normal breakpoint towards said other end of said blade to provide greater standout length for said blade, the radius $R_2$ of the arcuate segment of said second blade portion decreasing in length and the depth $H_2$ increasing from said first portin towards said third portion of said blade; and
C. a coiled power return spring within a reel in said chamber and having its outer end engaged with the inner end of said blade which is coiled about said reel.

19. The coilable rule of claim 18 wherein the decrease in the radius $R_2$ and the increase in the depth $H_2$ in said second blade portion are at a substantially uniform rate over substantially the entire length of said second portion.

20. A coilable rule comprising
A. a casing having end walls and a peripheral sidewall defining a chamber therebetween, said sidewall having an exit aperture therethrough;
B. a coiled rule blade in said chamber having one end extending outwardly of said casing aperture, said blade comprising an elongated strip of resiliently deflectable metal having a substantially uniform width in its coiled flattened state and, in its uncoiled state, a concavo-convex transverse cross section along substantially its entire length with the arc opening in the direction of coiling, said blade being relatively free from stresses and relatively stable in the extended position, said cross section having a central segment of arcuate configuration defined by a radius R and having a depth H, the length of said blade being comprised of three portions, a first portion adjacent one end thereof with a depth $H_1$ and a radius $R_1$, a second portion extending from said first portion and having a depth $H_2$ and a radius $R_2$, and a third portion extending from said second portion to adjacent the other end thereof with a depth $H_3$ and a radius $R_3$, said second portion having a depth $H_2$ greater than the depth $H_1$ and $H_3$ of said first and third portions and a radius $R_2$ less than the radii $R_1$ and $R_3$ of said first and third portions, said second portion extending for a portion of the length of said blade which includes the normal breakpoint for a blade of said width and of a uniform cross section corresponding to the depth $H_1$ and radius $R_1$ of said first portion and which extends beyond said normal breakpoint towards said other end of said blade to provide greater standout length for said blade, the radius $R_2$ of the arcuate segment of said second blade portion increasing and its depth $H_2$ decreasing, at a rapid rate adjacent said third portion; and
C. a coiled power return spring within a reel in said chamber and having its outer end engaged with the inner end of said blade which is coiled about said reel.

21. In a method for making a coilable rule blade, the steps comprising
A. providing a length of resiliently deflectable metal strip having a width W;
B. forming a first portion of said length into a concavo-convex cross section having a central segment of arcuate configuration defined by a radius $R_1$ and having an overall depth $H_1$;
C. forming a second portion of said length into a concavo-convex cross section having a central segment of arcuate configuration defined by a radius $R_2$ and having an overall depth $H_2$, said radius $R_2$ being less than, and said depth $H_2$ being greater than, $R_1$ and $H_1$, respectively; and
D. forming a third portion of said depth extending from said second portion into a concavo-convex cross section having a central segment of arcuate configuration defined by a radius $R_3$ and having an overall depth $H_3$, said radius $R_3$ being greater than, and said depth $H_3$ being less than, $R_2$ and $H_2$, respectively.

22. The blade making method of claim 21 wherein said forming is by a cold forming technique in which the length is hardened and tempered and thereafter roll formed to shape the several portions of the length into the desired cross section.

23. The blade making method of claim 21 wherein said several portions of said length are formed initially in a roll forming operation in which the length is passed through a series of roll forming dies providing a substantially uniform configuration within said several portions, and thereafter further forming said second portion to the desired configuration.

24. The blade making method of claim 21 additionally including the step of forming a section of said length at the end of said first portion spaced from said second portion into a concavo-convex cross section having a central segment of arcuate cross section defined by a radius $R_4$ and an overall depth $H_4$ respectively greater and lesser than $R_1$ and $H_1$.

25. In a method for making a coilable rule blade, the steps comprising:
A. hot forming a length of resiliently deflectable strip having a width W into a concavo-convex cross section having a central segment of arcuate configuration defined by a radius $R_1$ and having an overall depth $H_1$;
B. quenching and tempering said strip;
C. further forming an intermediate portion of the length said strip into a concavo-convex cross section having a central segment of arcuate configuration defined by a radius $R_2$ and having an overall depth $H_2$, said radius $R_2$ being less than, and said depth $H_2$ being greater than, $R_1$ and $H_1$, respectively; and
D. stress relieving said intermediate portion, the arcs of the several portions opening in the direction of coiling and said blade being relatively free from stresses and relatively stable in an extended position.

* * * * *